United States Patent
Mandloi (10) Patent No.: US 11,188,892 B2
(45) Date of Patent: Nov. 30, 2021

(54) APPARATUS, SYSTEM AND METHOD FOR PROCESSING MULTIPLE PAYMENT TRANSACTIONS

(71) Applicant: MASTERCARD INTERNATIONAL INCORPORATED, Purchase, NY (US)

(72) Inventor: Abhay Mandloi, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/584,342

(22) Filed: Sep. 26, 2019

(65) Prior Publication Data

US 2021/0097519 A1 Apr. 1, 2021

(51) Int. Cl.
*G06Q 20/22* (2012.01)
*G06Q 20/40* (2012.01)
*G06Q 20/42* (2012.01)

(52) U.S. Cl.
CPC .......... *G06Q 20/29* (2013.01); *G06Q 20/405* (2013.01); *G06Q 20/425* (2013.01)

(58) Field of Classification Search
CPC ...... G06Q 20/29; G06Q 20/40; G06Q 20/405; G06Q 20/425; H04L 63/083
See application file for complete search history.

(56) References Cited

U.S. PATENT DOCUMENTS

| | | | |
|---|---|---|---|
| 2012/0311684 A1* | 12/2012 | Paulsen | G06F 21/44 726/6 |
| 2014/0136411 A1* | 5/2014 | Cho | G06Q 20/327 705/44 |
| 2017/0017958 A1* | 1/2017 | Scott | G06Q 20/36 |
| 2018/0082298 A1* | 3/2018 | Modi | H04L 63/083 |

* cited by examiner

*Primary Examiner* — Olabode Akintola
*Assistant Examiner* — Suckhwan Chon
(74) *Attorney, Agent, or Firm* — Jordan IP Law, LLC (57) ABSTRACT

Systems, apparatuses and methods may provide for technology to receive first payment details of a first transaction, where the first transaction is an online purchase by a user from a first merchant. The technology identifies a multiple-transaction selection associated with the first transaction. The technology receives second payment details of a second transaction, where the second transaction is an online purchase by the user from a second merchant. The technology performs a single security validation to validate the first payment details and the second payment details.

12 Claims, 6 Drawing Sheets

APPARATUS, SYSTEM AND METHOD FOR PROCESSING MULTIPLE PAYMENT TRANSACTIONS

FIELD OF THE INVENTION

The present invention relates generally to payment transactions, and, more particularly, to apparatuses, systems and methods for processing multiple electronic payment transactions.

BACKGROUND

Due to the advent of technology, cashless modes of payments have experienced an upward trend in use. Customers find the cashless modes of payments more convenient, as they do not have to carry cash with them for making purchases. Furthermore, cashless technology and the advent of the internet caused a proliferation of online merchants that sell products through the internet. Due to the convenience offered by the cashless modes of payments to the customers and merchants, merchants may require cashless payments (or confirmation of a cashless payment) prior to consummating an online transaction to ensure products and services are fully paid for prior to delivery.

For example, cardholders of credit and/or debit cards may easily purchase products online by simply providing their card details. In some cases, however, malicious actors may seek to impersonate the cardholders to purchase online goods using the cardholders' accounts. Thus, several validations may be executed to increase security of online payments and verify that the purchaser is the genuine cardholder. For example, to mitigate concerns of spoofing or unauthorized usage, the customer may be required to provide verification details (e.g., cardholder verification details) to ensure that the online payment is authentic in nature and is authorized by the account holder. If the verification details are validated, then it may be assumed that the customer genuinely authorizes the online payment and is therefore authenticated. If, however the verification details are not validated, it may be assumed that the online payment is not genuine and that an unauthorized third-party may be abusing the online payment system.

However, reentering verification details for validation may be inefficient, cumbersome and tiresome for a customer. For example, suppose that a customer would like to execute several transactions across several online merchant stores. The customer may be asked for verification details for each transaction. Providing verification details several times may be error prone, redundant, and tiresome for the customer.

Moreover, a computing device (e.g., a server) may consume power and processing resources to request and validate the verification details. As such, more computing resources are needed when the frequency of such requests and validations increases. Furthermore, each request and validation of the verification details has a latency, which may further degrade computational efficiency through waiting and other inefficiencies. Moreover, transmission and reception of requests and verification details inefficiently increase internet usage.

Moreover, in some cases the verification details may be sensitive in nature (e.g., a private code for an account that provides an additional layer of online shopping security or a card verification value). Reducing the usage of such verification details in an online context may enhance security since transmission of such verification details across unsecure mediums (e.g., airport wi-fi or unsecured networks) may allow access by third parties to the verification details. Such third parties may then use the verification details to execute unauthorized purchases.

In various exemplary scenarios, a customer may want to purchase products and/or services from several online merchants. That is, the customer may perform multiple e-commerce transactions. When customers perform multiple e-commerce transactions, the customers may need to authenticate (e.g., securely validate themselves) multiple times. For example, the customers may be authenticated using 3D secure methods (e.g., secure code authentication).

As one scenario, a customer may execute several transactions in a short period of time (e.g., placing multiple food orders for lunch over the next five minutes) using different service providers and/or merchants. For every transaction, the customer (e.g., a credit and/or debit cardholder) will be redirected to a payment gateway. For each payment at the payment gateway, the customer may have to execute a secure code validation, resulting in multiple secure code validations.

Requesting and validating multiple validation details (e.g., secure codes) increases power consumption, reduces efficiency and increases latency of each transaction. Thus, doing so is computationally inefficient and may needlessly consume resources. Moreover, doing so may also result in a negative customer experience due to the increased effort of entering validation details multiple times and the increased latency of each transaction. Thus, customers may choose not to utilize certain forms of payment (e.g., a specific online payment) that requires validation details.

In light of the foregoing, there exists a need for a solution for facilitating multiple online transactions while also reducing the verification details needed to execute such online transactions.

SUMMARY

Various embodiments of the present disclosure provide methods and systems for managing online transactions with enhanced security and stability.

Some embodiments include a computing device for processing multiple transactions. The computing device may include a network interface to receive first payment details of a first transaction and second payment details of a second transaction, wherein the first transaction is an online purchase by a user from a first merchant, further wherein the second transaction is an online purchase by the user from a second merchant. The device may further include a processor that is configured to identify a multiple-transaction selection associated with the first transaction and perform a single security validation to validate the first payment details and the second payment details.

Some embodiments include a method for processing multiple transactions is disclosed. The method includes receiving, by one or more servers, first payment details of a first transaction, wherein the first transaction is an online purchase by a user from a first merchant. The method further includes identifying, by the one or more servers, a multiple-transaction selection associated with the first transaction. The method further includes receiving, by the one or more servers, second payment details of a second transaction, wherein the second transaction is an online purchase by the user from a second merchant. The method further includes performing, by the one or more servers, a single security validation to validate the first payment details and the second payment details.

Some embodiments include, at least one computer readable storage medium comprising a set of instructions, which when executed by a computing device, cause the computing device to receive first payment details of a first transaction, wherein the first transaction is an online purchase by a user from a first merchant, identify a multiple-transaction selection associated with the first transaction, receive second payment details of a second transaction, wherein the second transaction is an online purchase by the user from a second merchant, and perform a single security validation to validate the first payment details and the second payment details.

Other aspects and example embodiments are provided in the drawings and the detailed description that follows.

BRIEF DESCRIPTION OF THE DRAWINGS

The accompanying drawings illustrate various embodiments of systems, methods, and other aspects of the invention. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the present invention are illustrated by way of example, and not limited by the appended figures, in which like references indicate similar elements, and in which.

Further areas of applicability of the present invention will become apparent from the detailed description provided hereinafter. It should be understood that the detailed description of exemplary embodiments is intended for illustration purposes only and is, therefore, not intended to necessarily limit the scope of the present invention.

DETAILED DESCRIPTION

The present invention is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example" and so on, indicate that the embodiment (s) or example (s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

OVERVIEW

Various embodiments of the present invention provide a method and a system for efficiently processing multiple electronic payment transactions. The multiple electronic payment transactions may be performed by a customer of online merchants, through various websites, and may need only a single input of verification details. In an embodiment of the present invention, the single input of the verification details may allow a customer to make several online purchases from various online merchants. For example, the customer may be allowed to execute online transactions for a window of time after providing the verification details. The window of time may vary based on a number of factors, such as security of a computing device of the user and an associated internet connection, whether the computing device is a public machine or private, etc. In some embodiments, the customer may select the window of time.

In some embodiments, the multiple transactions may be contained at a particular level of the payment process (e.g., gateway level), until the last transaction of the multiple transactions is received at the particular level. For example, the multiple transactions may not be fully processed for payment until the last multiple transaction is received. Once the last multiple transaction is received, the user may be prompted to provide the verification details and the payment process may then proceed upon verification of the payment details. Thus, the user may not need to enter verification details after each transaction and/or request for payment. Rather one instance of the verification details may be provided after the last multiple transaction is received.

Thus, the methods and the systems, in accordance with various embodiments of the present invention, facilitates multiple transactions using only one security validation. The one security validation may include the user providing the verification details and the gateway verifying that the verification details are correct. Minimizing the number of requests and validations of verification details may increase computing efficiency, reduce power consumption and preserves valuable computing resources.

Terms Description (in Addition to Plain and Dictionary Meaning)

Server is a physical or cloud data processing system on which a server program runs. A server may be implemented in hardware or software, or a combination thereof. In one embodiment, the server includes a computer program that is executed on programmable computers, such as personal computers, laptops, or a network of computer systems. The server may correspond to a merchant server, an acquirer server, a payment network server, an issuer server, or a digital wallet server.

Merchant is an entity that offers various products and/or services in exchange of payments. The merchant may establish a merchant account with a financial institution to accept payments from several customers.

Issuer is a financial institution where accounts of several customers are established and maintained. The issuer ensures payment for authorized transactions in accordance with various payment network regulations and local legislation.

Payment network is a transaction card association that acts as an intermediate entity between acquirers and issuers to authorize and fund transactions. Examples of payment networks include Mastercard®, American Express®, VISA®, Discover®, Diners Club®, and the like. The Payment network settles transactions between various acquirers and issuers, when transaction cards are used for initiating transactions. The payment network ensures that a transaction card used by a customer for initiating a transaction is authorized.

Payment gateway may be a platform to allow secure processing of payments online. For example, the payment gateway may be a platform which enables merchants to authorize and process the online transactions securely.

An acquiring bank (also known simply as an acquirer) may be a bank or financial institution that processes credit or debit card payments on behalf of a merchant.

Various exemplary embodiments of the present invention have been further described in detail with reference to FIGS. 1 to 5.

Figure 1:
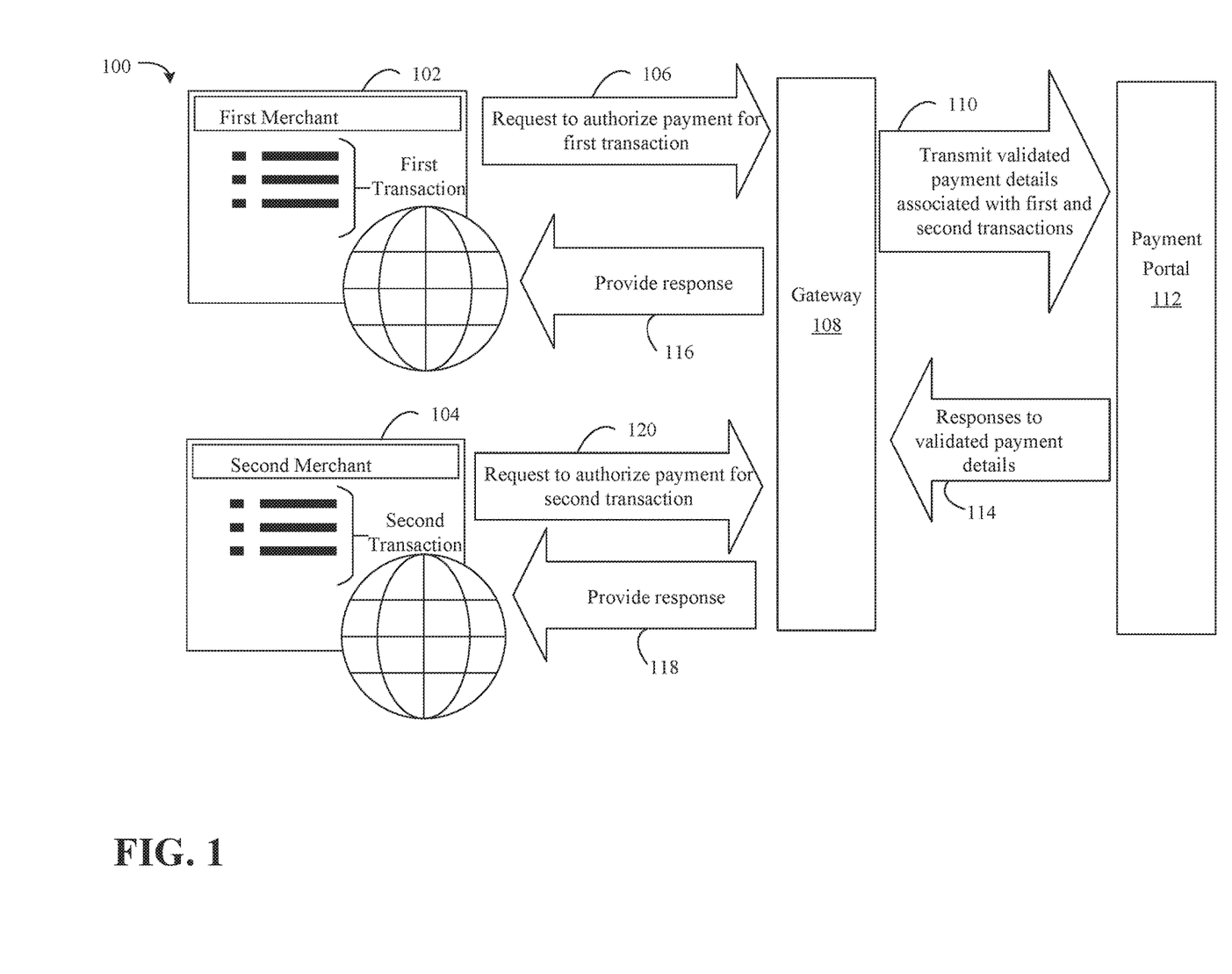
FIG. 1 illustrates a process to execute multiple online transactions in accordance with some embodiments.

FIG. 1 illustrates a process 100 to execute multiple online transactions based on a single security validation. A user (e.g., a customer) may be at a first merchant website 102. The first merchant website 102 may include a first transaction. The first transaction may be a sale of a product and/or service from the first merchant to the user. The user may request the first merchant to complete the first transaction (e.g., confirm that the first transaction is accepted by the first merchant) to provide the user with the service and/or product associated with the first transaction. In order to do so however, the first merchant may require payment, proof of payment or authorization for payment.

To finalize the first transaction, the first merchant website 102 may cause a generation of a request to authorize payment for the first transaction 106. For example, the user may provide payment details (e.g., credit card account number, debit card account number, etc.) at a computing device (e.g., a point of origin) that displays the first merchant website 102. The payment details may be encrypted and transmitted to the first merchant's web server, who in turn forwards the payment details to a gateway 108 (e.g., a server) as part of the request to authorize payment for the first transaction 106. The request to authorize payment for the first transaction 106 may also provide an indication to the gateway 108 that the user desires a multiple payment transactions method to avoid providing verification details multiple times (explained further below). The indication may be provided by the user.

The user may also execute a second transaction from a second merchant website 104. The second merchant may be different from and not associated with the first merchant. For example, the first merchant may be a first company (e.g., clothing) while the second merchant may be a second company (e.g., gardening tools). As illustrated and similarly to as above, a server of the second merchant may issue a request to authorize payment for the second transaction in response to the user requesting completion of the second transaction. The request to authorize payment for the second transaction 120 may further include the payment details (e.g., credit card account number and/or debit card account number). It is worth noting that the payment details to pay the second transaction may be the same as the payment details to pay the first transaction.

To verify the authenticity of the payment details, and in particular to verify that the payment details are provided by an authorized user, the gateway 108 may request further details from the user to execute a single security validation. That is, the gateway 108 may conduct a single security validation to validate and/or verify that the payment details provided with respect to the first and second transaction are genuine and provided by an authenticated and/or authorized user.

For example, after receiving the payment details the gateway 108 may execute the single security validation through a request for verification information from the user. For example, the user may be prompted by the gateway 108 to provide verification information such as CCV numbers, private codes, answer to challenge questions, etc. to verify that the user is authentic and the genuine account holder of the account associated with the payment details (e.g., the actual cardholder of the credit card). In some embodiments, the gateway 108 may issue a one-time pin or password (OTP) to the user as the verification information. To validate the payment details, the user may need to enter the OTP directly to the gateway 108 and/or through the first or second merchant website 102. The gateway 108 may verify that the verification information is correct (e.g., that the OTP, CCV, answers to challenge questions, private code are correct). Based on the verification information being correct, the gateway 108 may determine that the user is the genuine account holder and validate the payment details.

In some embodiments, the validation of the payment details may be executed based on the first transaction and before the second transaction is received. For example, when the payment details for the first transaction are provided to the gateway 108, the gateway 108 may then validate the payment details at that time. Thereafter, for some window of time, the gateway 108 may not need to validate the payment details again. Thus, when the payment details for the second transaction are received by the gateway 108, the gateway 108 may determine that the payment details were recently verified during the first transaction, and that the payment details for the second transaction are received within the window of time. Therefore, the gateway 108 does not request verification details again to verify the payment details of the second transaction. It is worth noting that the gateway 108 may verify that the payment details in the first and second transactions are the same in order to validate the payment details of the second transaction based on the validation of the payment details of the first transaction.

In some embodiments, the gateway 108 may execute security checks to reduce the possibility of spoofing or abuse. For example, the gateway 108 may determine that a point of origin (e.g., a computing device, a same web browser, same IP address) of the first and second transactions are the same. For example, the gateway 108 may obtain an IP address of a point of origin where the first and second transactions (e.g., from the first or second merchants and/or from direct communication with the user computing device) were first requested and/or agreed upon by the user. If the IP addresses match, the gateway 108 may validate the second transaction based on the validation of the first transaction.

In some embodiments, the security check may include an identification of a unique code and/or information in the requests, such as the request to authorize payment for the second transaction 120. For example, after the gateway 108 validates the payment details for the first transaction, the gateway 108 may transmit a unique identifier (e.g., a unique code, data, algorithm to generate unique data) to the user's computing device to establish a secure session. The secure session may be similar to other secure web sessions. The unique code and/or information may be received by a web browser on the computing device (e.g., the client machine) that displays the first merchant website 102 and the second merchant website 104, and the unique code and/or information may be used (e.g., transmitted) in any subsequent transaction which is being sent from the browser to gateway 108, and will help the gateway 108 determine a point of origin of the request.

If the unique code is missing or incorrect in a request to authorize payment for a transaction, the gateway 108 may require the security validation to execute to validate the payment details for the transaction. If the unique code is in a request to authorize payment for a transaction and is correct, the gateway 108 may not require the security validation to validate the payment details for the transaction. In some embodiments, the unique identifier may include an algorithm to generate unique codes (for example based on the price being requested, the current time, etc.) that are to be transmitted along with requests. The gateway 108 may verify that the unique code is correct similarly to as above to determine whether to validate the transaction based on the single security transaction.

In some embodiments, the user may select the window of time during which the verification details will not be required. In some embodiments, the gateway 108 may select the window of time based on various factors, such as a security context of a computing device of the user. For example, if the computing device is transmitting data (e.g., the first and second transaction data) over a high-risk connection (e.g., public wireless connection), the window of time may be set to a low value (e.g., 30 seconds) to avoid potential abuses and spoofing. If the computing device is transmitting the data over a robust and safe connection (secured private connection), the gateway 108 may set the window of time to a higher value (e.g., 10 minutes).

In some embodiments, the gateway 108 may automatically cancel validated details if a context of the point of origin changes (e.g., computing device switches from low-risk connection to high-risk connection). For example, suppose that the payment details are validated to approve the first transaction, and that the connection for the computing device is a private secure network. Thereafter and before the request to authorize payment for a third transaction, the context of the computing device changes. The gateway 108 may detect such a context switch, and automatically require the payment details to again be validated. That is, the gateway 108 may not automatically validate the payment details for the third transaction even though the third transaction may occur within the window of time and originate from the same computing device as the first transaction.

In some embodiments, rather than validating the payment details when the gateway 108 receives the request to authorize payment for the first transaction 106, the gateway 108 may rather accumulate a series of requests and validate the payment details when the last request for authorization of payment is received. For example, suppose that the request to authorize payment for the first transaction 106 includes an indication that the user selected "multiple transactions." The gateway 108 may not immediately validate the payment details for the payment for the first transaction. Rather, the gateway 108 may wait to validate the payment details in response to an indication that a request to authorize payment is for last transaction of the multiple transactions. For example, the request to authorize payment for the second transaction 120 may include an indication that the request 120 is the last of the multiple transactions. In response to the indication that the request 120 is the last, the gateway 108 may validate the payment details for the second transaction as described herein. The gateway 108 may further determine that the payment details for the first and second transactions are the same and validate the payment details for the first transaction based on the validation of the payment details of the second transaction.

The gateway 108 may transmit validated payment details associated with the first and second transactions 110 to the payment portal 112 (e.g., one or more of an acquirer, network or issuer). The validated payment details may be transmitted serially (one after the other) for example when the gateway 108 executes the validation process to verify the payment details for the first transaction and validates the payment details for the second transaction based on the validation process associated with the first transaction. That is, the transmission of the validated payment details 110 may be spread out over time, and do not necessarily need to occur together.

In some embodiments however, gateway 108 may send the payment details of the first and second transactions together. For example, if the payment details are validated after the last transaction is received, all the payment details of the multiple transactions may be sent to the payment portal 112 together as part of the transmission of validated payment details associated with the first and second transactions 110.

The payment portal 112 may then determine whether to authorize or decline the payment requests based on the validated payment details. The responses to the validated payment details 114 may include an indication of authorization or declination decision of the payment portal 112. The gateway 108 may then provide the responses to the appropriate web pages 102, 104 (e.g., via the first or second merchants or with a direct update to the web page). That is, the gateway 108 may determine the response to the request for authorization for payment the first transaction 106 and provide the response to the first merchant website 102. The gateway 108 may determine the response to the request for authorization for payment for the second transaction 120 and provide the response to the second merchant website 104. Based on the responses, the first and second merchants will be able to determine whether payment will be received or not.

While two transactions are illustrated above, it will be understood that the above methods are applicable to any number of transactions. Furthermore, it will be understood that various methods may be used for validation. Moreover, the distinction of functions may be interchanged between various elements. For example, the first merchant website 102 may retrieve details from the gateway 108 to present details to the user about the first transaction, and likewise the second merchant website may retrieve details from the gateway 108 to present details the user about the second transaction.

Figure 2:
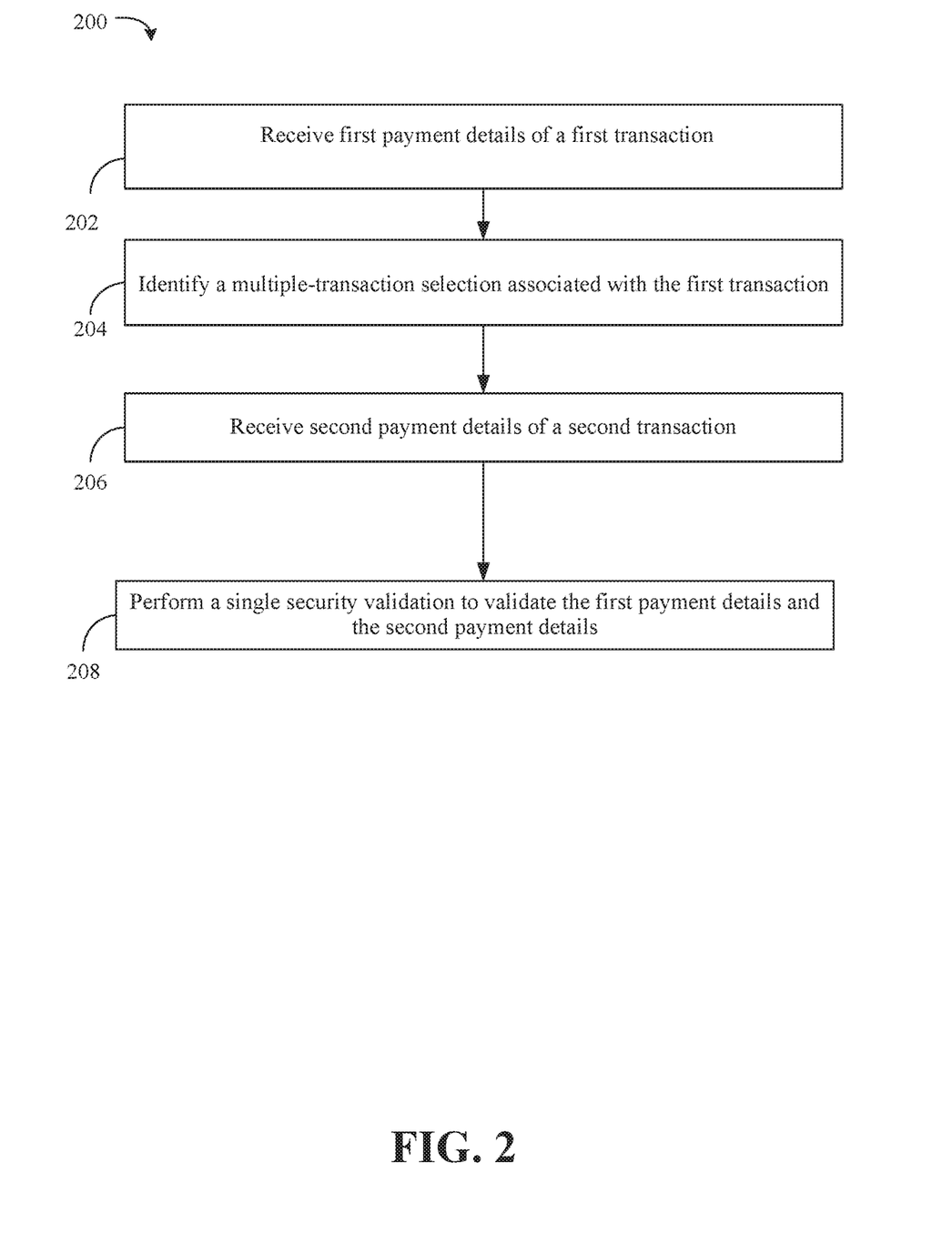
FIG. 2 is a process flow diagram that illustrates processing multiple transactions, in accordance with some embodiments.

FIG. 2 is a method 200 that illustrates processing multiple transactions, in accordance with an embodiment of the present invention. Method 200 may be implemented in at least one computer readable storage medium comprising a set of instructions, which when executed by a computing device, cause the computing device to execute the following steps. In some embodiments, process flow diagram 200 may be executed by hardware elements (e.g., circuitry, fixed-function logic hardware, configurable logic, etc.). In some embodiments, method 200 may be implemented in combinations of hardware elements and software. Method 200 may be implemented by a server for example. Illustrated processing block 202 receives first payment details of a first transaction. The first transaction is an online purchase by a user from a first merchant. Illustrated processing block 204 identifies a multiple-transaction selection associated with the first transaction. The selection may be input by a user at the user device. Illustrated processing block 206 receives second payment details of a second transaction. The second transaction is an online purchase by the user from a second merchant. Illustrated processing block 208 performs a single security validation to validate the first payment details and the second payment details.

Figure 3:
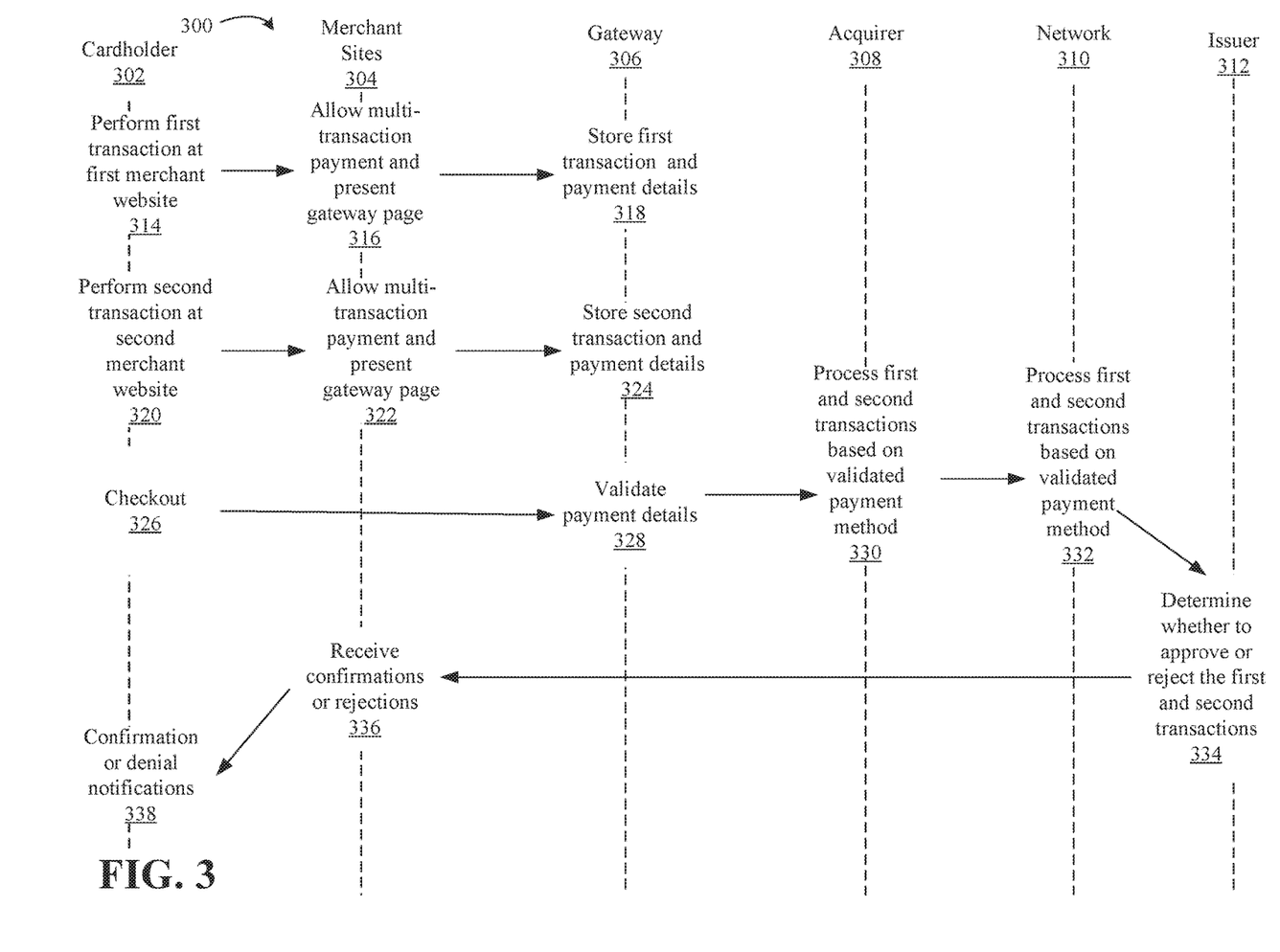
FIG. 3 illustrates an execution of a multiple transaction process in which a single security validation occurs during a last transaction of the multiple transaction process in accordance with some embodiments.

FIG. 3 illustrates an execution of a multiple transaction process 300. Process 300 may be implemented in at least one computer readable storage medium comprising a set of instructions, which when executed by a computing device, cause the computing device to execute the following steps. In some embodiments, process flow diagram 300 may be executed by hardware elements (e.g., circuitry, fixed-function logic hardware, configurable logic, etc.). As illustrated, various actions may be taken by various actors. A cardholder 302, merchant sites 304, gateway 306, acquirer 308, network 310 and issuer 312 may each execute actions that are on the dashed lines aligned with the cardholder 302, merchant sites 304, gateway 306, acquirer 308, network 310 and issuer 312.

The cardholder 302 may perform a first transaction at a first merchant website 314 (e.g., online vendor). The merchant sites 304 (e.g., the first merchant website) may allow for a selection of a multi-transaction (multiple-transaction) payment and present (e.g., open and/or redirect) a gateway page 316 to receive payment from the user. For example, the cardholder 302 may provide payment details to the gateway page and select the multi-transaction payment. In some embodiments, the gateway page may allow selection of the multi-transaction option. The gateway 306 may store the first transaction in association with payment details 318. For example, the gateway page may display a card number of the payment details and the first transaction (e.g., items to be purchased).

The cardholder 302 may then perform a second transaction at a second merchant website 320 (e.g., online vendor). The merchant sites 304 (e.g., the second merchant website) may allow for the selection of the multi-transaction payment and present (e.g., open and/or redirect) the gateway page 322 to receive payment from the user. For example, the cardholder 302 may provide payment details to the gateway page and select the multi-transaction payment. In some embodiments, the gateway page may allow selection of the multi-transaction payment. The gateway 306 may store the second transaction in association with the payment details 324. For example, the gateway page may display the card number of the payment details and the first and second transactions (e.g., items, products and/or services that are purchased, amounts of the purchases, etc.).

The cardholder 302 may checkout 326. The user may checkout through one or more of the merchant sites 304, and/or through the gateway 306. In response, the gateway 306 may validate the payment details 328 through the methods described herein (e.g., an OTP process, CCV inquiries, answer to challenge questions). For example, the gateway 306 may validate the payment details for the first and second transactions. The payment details may be the same, so only one single security validation may be required. The validation of the payment details 328 may include validation of the payment details for the first transaction based on the validation of the payment details for the second transaction.

The validated payment details may be provided to the acquirer 308 and network 310, which process the first and second transactions based on the validated payment method 330, 332 (the validated payment details). The issuer 312 may determine whether to approve or reject payment for the first and second transactions 334 and transmit the approval or rejection to the merchant sites 304. The merchant sites 304 may receive the confirmation or rejections 336, to determine whether to authorize or deny the first and second transactions. The cardholder 302 may receive the confirmation or denial notifications, for example through the merchant sites 304.

Figure 4:
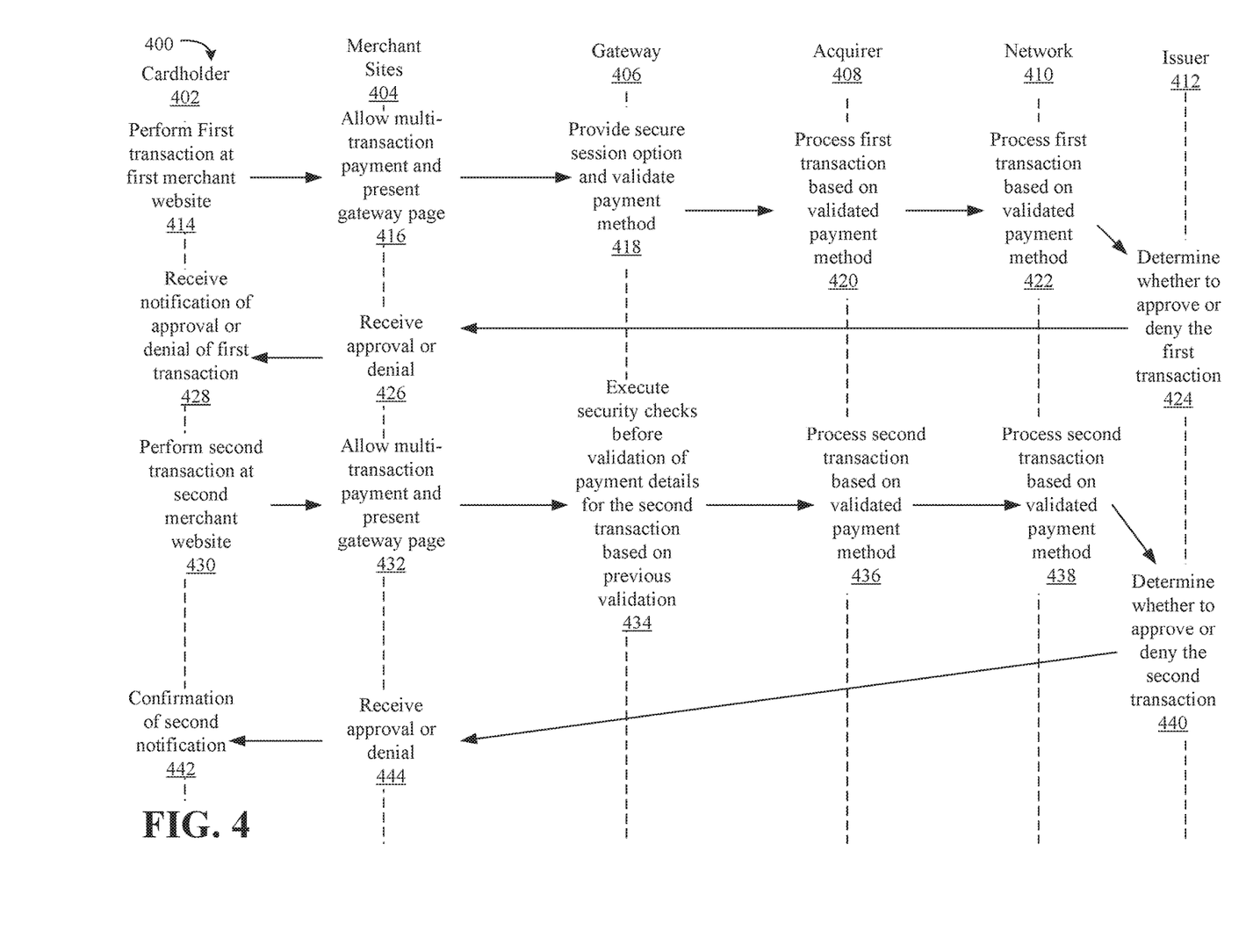
FIG. 4 illustrates an execution of a multiple transaction process in which a single security validation occurs during a first transaction of the multiple transaction process in accordance with some embodiments.

FIG. 4 illustrates an execution of a multiple transaction process 400. Process 400 may be implemented in at least one computer readable storage medium comprising a set of instructions, which when executed by a computing device, cause the computing device to execute the following steps. In some embodiments, process flow diagram 400 may be executed by hardware elements (e.g., circuitry, fixed-function logic hardware, configurable logic, etc.). As illustrated, various actions may be taken by various actors. As illustrated, cardholder 402, merchant sites 404, gateway 406, acquirer 408, network 410 and issuer 412 may each execute actions that are on the dashed lines aligned with the cardholder 402, merchant sites 404, gateway 406, acquirer 408, network 410 and issuer 412.

The cardholder 402 may perform a first transaction at a first merchant website 414 (e.g., online vendor). The merchant sites 404 (e.g., the first merchant website) may allow for a selection of a multi-transaction (multiple-transaction) payment and present (e.g., open and/or redirect) a gateway page 416 to receive payment from the user. In some embodiments, the gateway page may provide the multi-transaction option. For example, the cardholder 402 may provide a payment method (e.g., payment details) to the gateway page and select the multi-transaction payment. The gateway 406 may validate the payment method (similarly to as described herein) and present a secure session option. In this particular example, the cardholder 402 selects secure session option. The gateway 406 may further identify a window of time (e.g., user input or determined based on factors) to validate payment details for further transactions based on the validation of the payment method for the first transaction.

The acquirer 408 and network 410 may process the first transaction based on the validated payment method 420, 422. The issuer 412 may determine whether to approve or deny the first transaction 424. The merchant sites 404 may receive the approval or denial 426 from the issuer 412, and the cardholder 402 may receive a notification of the approval or denial of the first transaction 428 as well.

The cardholder 402 may perform a second transaction at a second merchant website 430 (e.g., online vendor). The merchant sites 404 (e.g., the second merchant website) may allow for a selection of a multi-transaction (multiple-transaction) payment and present (e.g., open and/or redirect) the gateway page 432 to receive payment from the user. In this particular example, the user may not need to provide the payment details (e.g., credit card details) again. Rather, at the gateway page the user may only need to select that the same payment for the first transaction is to be used for the second transaction.

The gateway 406 may execute security checks before a validation of payment details for the second transaction based on the previous validation for the first transaction. For example, the gateway 406 may verify that the second transaction is within the window of time of the first transaction to avoid redundant validations (e.g., avoid validation of payment details for the second transaction). In some embodiments, the gateway 406 may also perform session information validation to verify the sources of the first and second transactions (e.g., verify that the source of the first transaction is the same as the source for the second transaction). In some embodiments, the gateway 406 may verify the sources based on IP addresses.

The acquirer 408 and network 410 may process the second transaction based on the validated payment method 436, 438. As described, the payment method was validated with respect to the first transaction, but not necessarily the second transaction. The issuer 412 may determine whether to approve or deny the second transaction 440. The merchant sites 404 may receive the approval or denial 444 from the issuer 412, and the cardholder 402 may receive a notification of the approval or denial of the first transaction 442 as well.

Figure 5:
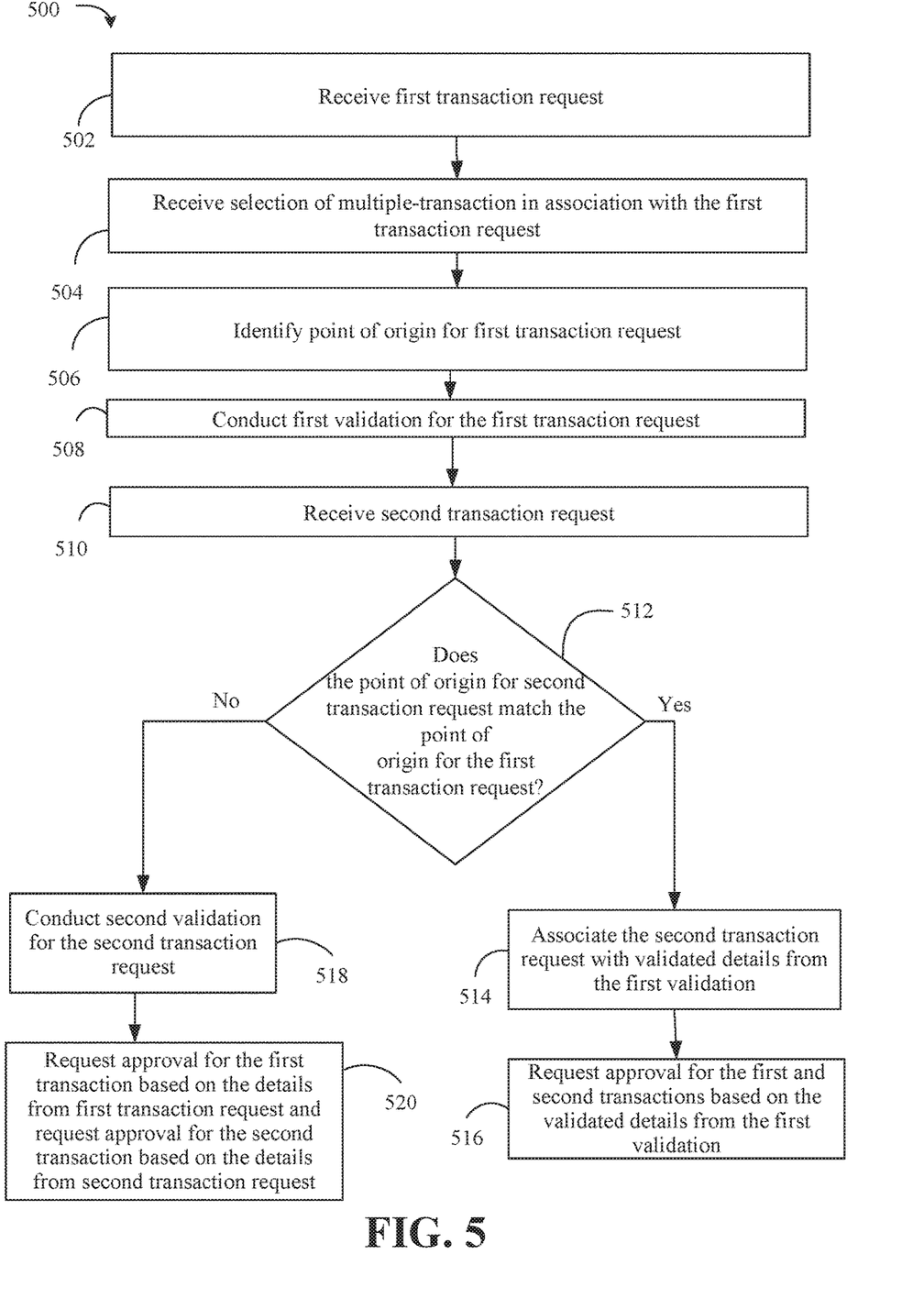
FIG. 5 is a process flow diagram that illustrates a method for verifying points of origin during a multi-transaction process, in accordance with some embodiments.

FIG. 5 illustrates a method 500 of verifying points of origin during a multi-transaction process. Method 500 may be implemented in at least one computer readable storage medium comprising a set of instructions, which when executed by a computing device, cause the computing device to execute the following steps. In some embodiments, the method 500 may be executed by hardware elements (e.g., circuitry, fixed-function logic hardware, configurable logic, etc.). Illustrated processing block 502 receives a first transaction request. Illustrated processing block 504 receives a selection of multiple transactions in association with the first transaction request. For example, the first transaction request may be the first transaction request of the multiple transactions. Illustrated processing block 506 identifies a point of origin for the first transaction request. Illustrated processing block 508 conducts a first validation for the first transaction request. Illustrated processing block 510 receives a second transaction request. Illustrated processing block 512 determines whether the point of origin for second transaction request matches the point of origin for the first transaction request. Processing block 512 may use unique transmission characteristics (e.g., IP address of machine(s) that transmitted the requests) associated with the first and second transaction requests to determine whether the point of origin is the same. For example, if the IP address of a machine that transmitted the first transaction request is the same as the IP address of a machine that transmitted the second transaction request, processing block 512 may determine that the machines are the same, and therefore that the point of origins are the same. In some embodiments, processing block 512 may include an include an identification that the second transaction request includes a unique code assigned to the point of origin.

If so, illustrated processing block 514 associates the second transaction request with validated details from the first validation. For example, processing block 514 validates the payment method for the second transaction based on the first validation. Illustrated processing block 516 requests approval for the first and second transactions based on the validated details from the first validation.

If processing block 512 determines that the points of origin are different, illustrated processing block 518 conducts a second validation for the second transaction request. Processing block 520 requests approval for the first transaction based on the details from the first transaction request and requests approval for the second transaction based on the details from second transaction request.

Figure 6:
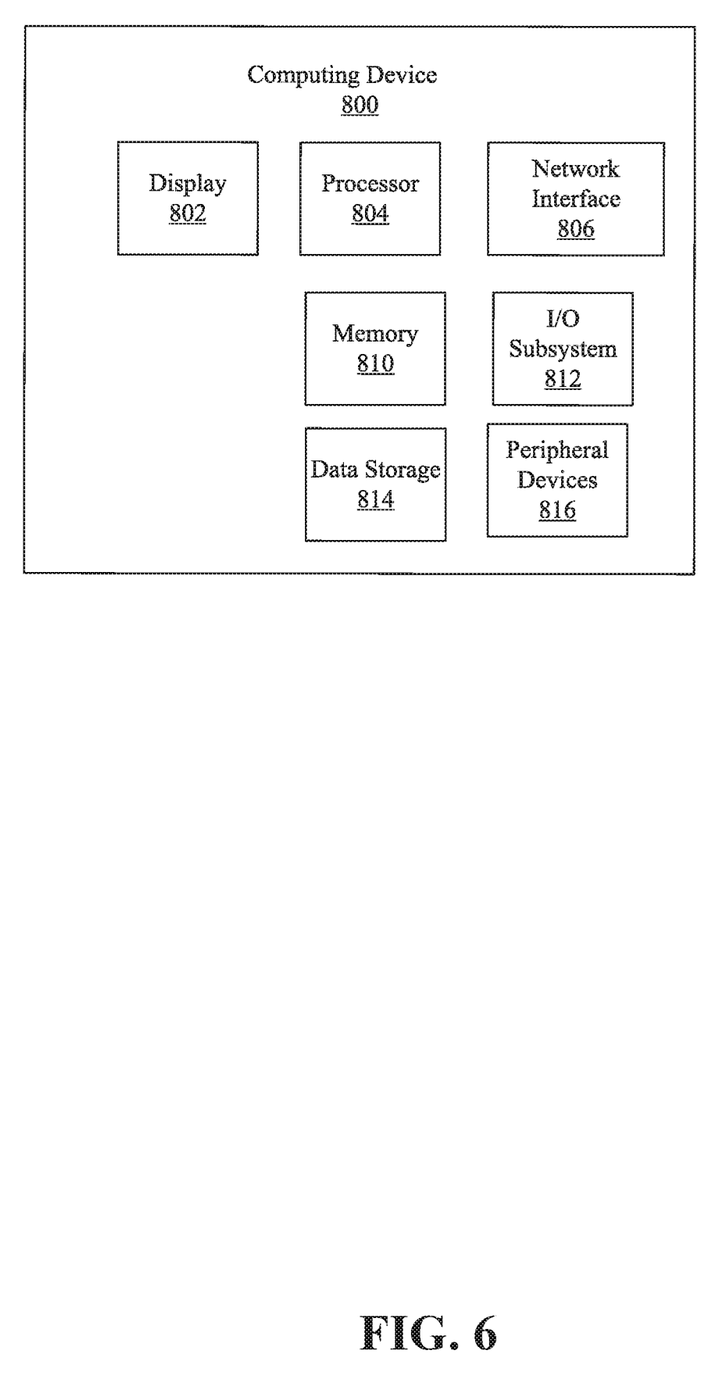
FIG. 6 is a block diagram of a computing device, in accordance with some embodiments.

FIG. 6 is a block diagram that illustrates the gateway 108 (e.g., a server) of the environment 100 of FIG. 1, the gateway 306 of FIG. 3, the gateway 406 of FIG. 4 and in accordance with an embodiment of the present invention. The computing device 800 may further implement the method 200 of FIG. 2 and the method 500 of FIG. 5. The computing device 800 includes a processor 804, a memory 810, and a network interface 806.

The processor 804 includes suitable logic, circuitry, and/or interfaces to execute operations for facilitating electronic transactions and validations performed by using various electronic payment modes, such as transaction cards or e-wallets. The processor 804 performs such operations by means of hardware techniques, and/or under the influence of program instructions stored in the memory 810. Examples of the processor 804 include, but are not limited to, circuitry, an fixed application-specific integrated circuit (ASIC) processor, a reduced instruction set computing (RISC) processor, a complex instruction set computing (CISC) processor, a field-programmable gate array (FPGA), a graphics processing unit and the like.

The memory 810 includes suitable logic, circuitry, and/or interfaces to store information of payment methods, validation methods, acquirers, and partner merchants. Examples of the memory 810 include a random-access memory (RAM), a read-only memory (ROM), a removable storage drive, a hard disk drive (HDD), a flash memory, a solid-state memory, and the like.

It will be apparent to a person skilled in the art that the scope of the invention is not limited to realizing the memory 810 in the computing device 800, as described herein. In another embodiment, the memory 810 may be realized in a form of a database server or a cloud storage working in conjunction with the computing device 800, without departing from the scope of the present invention.

The network interface 806 includes suitable logic, circuitry, and/or interfaces that transmits and receives data over communication networks using one or more communication network protocols under the control of the processor 804. The network interface 806 transmits/receives various requests and messages to/from the merchant servers, acquirers, etc. Examples of the network interface 806 include, but are not limited to, an antenna, a radio frequency transceiver, a wireless transceiver, a Bluetooth transceiver, an ethernet port, a universal serial bus (USB) port, or any other device configured to transmit and receive data. The network interface 806 may receive first payment details of a first transaction and second payment details of a second transaction. The first transaction is an online purchase by a user from a first merchant, and the second transaction is an online purchase by the user from a second merchant. The network interface 806 may provide the received data (e.g., first transaction, first payment details, second transaction, second payment details) to other components, such as the processor 804.

The processor 804 may validate the first and second payment details as described herein. For example, the processor 804 may transmit an OTP to the genuine account holder of the account of the first and second payment details with the network interface 806. The network interface 806 may receive an input of the OTP from a computing device of the user and provide the input of the OTP. The processor

804 may verify that the input is the same as the OTP transmitted to the user and validate one or more of the first and second payment details if so.

Additionally, in some embodiments, one or more of the illustrative components may be incorporated in, or otherwise form a portion of, another component. For example, the memory 810, or portions thereof, may be incorporated in the processor 804 in some embodiments. The computing device 800 may be embodied as, without limitation, a mobile computing device, a smartphone, a wearable computing device, an Internet-of-Things device, a laptop computer, a tablet computer, a notebook computer, a computer, a workstation, a server, a multiprocessor system, and/or a consumer electronic device.

The processor 804 may be embodied as any type of processor capable of performing the functions described herein. For example, the processor 804 may be embodied as a single or multi-core processor(s), digital signal processor, microcontroller, or other processor or processing/controlling circuit.

The memory 810 may be embodied as any type of volatile or non-volatile memory or data storage capable of performing the functions described herein. In operation, the memory 810 may store various data and software used during operation of the computing device 800 such as operating systems, applications, programs, libraries, and drivers. The memory 810 is communicatively coupled to the processor 804 via the I/O subsystem 812, which may be embodied as circuitry and/or components to facilitate input/output operations with the processor 804 the memory 810, and other components of the computing device 800.

The data storage device 814 may be embodied as any type of device or devices configured for short-term or long-term storage of data such as, for example, memory devices and circuits, memory cards, hard disk drives, solid-state drives, non-volatile flash memory, or other data storage devices. With respect to validation, the data storage device 814 may store data (e.g., computer code) to execute the processes and methods described herein. Alternatively, such data may be stored remotely. In some embodiments, the processor 804 or other hardware components may be configured to execute the processes and methods.

As shown, the computing device 800 may further include one or more peripheral devices 816. The peripheral devices 816 may include any number of additional input/output devices, interface devices, and/or other peripheral devices. For example, in some embodiments, the peripheral devices 816 may include a display, touch screen, graphics circuitry, keyboard, mouse, speaker system, microphone, network interface, and/or other input/output devices, interface devices, and/or peripheral devices. The computing device 800 may also perform one or more of the functions described in detail above.

As shown, the computing device 800 may further include a display 802. The display 802 may present details regarding various transactions to a user.

Techniques consistent with the present invention provide, among other features, systems and methods for processing payment transactions. While various exemplary embodiments of the disclosed system and method have been described above it should be understood that they have been presented for purposes of example only, not limitations. It is not exhaustive and does not limit the invention to the precise form disclosed.

In the claims, the words 'comprising', 'including' and 'having' do not exclude the presence of other elements or steps then those listed in a claim. The terms "a" or "an," as used herein, are defined as one or more than one. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

What is claimed is:

1. A computing device for processing multiple transactions, comprising:
   a network interface to receive a first transmission that includes first payment details of a first transaction and a second transmission that includes second payment details of a second transaction, wherein the first transaction is an online purchase by a user from a first merchant, further wherein the second transaction is an online purchase by the user from a second merchant; and
   a processor that is configured to:
      identify a multiple-transaction selection associated with the first transaction;
      perform a single security validation to validate the first payment details;
      identify a security context of a point of origin for the first payment details, wherein the security context identifies whether the first payment details were transmitted over a private network or a public network;
      in response to the first payment details being verified, transmit an algorithm to the point of origin, and automatically determine a window of time based on the security context to establish a secure session to validate transactions based on the single security validation of the first payment details;
      identify a first unique value in the second transmission;
      conduct a first verification that the first unique value is generated based on the algorithm;
      conduct a second verification that the second transaction occurs within the window of time; and
      validate the second payment details based on the single security validation of the first payment details, the first verification and the second verification.

2. The computing device of claim 1, wherein the processor is further to:
   perform the single security validation when the first payment details are received by the network interface and before the second payment details are received by the network interface.

3. The computing device of claim 1, wherein the processor is further to:
   set the window of time to a first value when the first payment details are transmitted over the private network; and
   set the window of time to a second value when the first payment details are transmitted over the public network, wherein the first value is greater than the second value.

4. The computing device of claim 1, wherein the processor is further to:

execute a session verification to verify that the first payment details and the second payment details are originally provided from a same point of origin to validate the second payment details based on the single security validation of the first payment details.

5. At least one computer readable storage medium comprising a set of instructions, which when executed by a computing device, cause the computing device to:
receive a first transmission that includes first payment details of a first transaction, wherein the first transaction is an online purchase by a user from a first merchant;
identify a multiple-transaction selection associated with the first transaction;
receive a second transmission that includes second payment details of a second transaction, wherein the second transaction is an online purchase by the user from a second merchant;
perform a single security validation to validate the first payment details;
identify a security context of a point of origin for the first payment details, wherein the security context identifies whether the first payment details were transmitted over a private network or a public network;
in response to the first payment details being verified, transmit an algorithm to the point of origin, and automatically determine a window of time based on the security context to establish a secure session to validate transactions based on the single security validation of the first payment details;
identify a first unique value in the second transmission;
conduct a first verification that the first unique value is generated based on the algorithm;
conduct a second verification that the second transaction occurs within the window of time; and
validate the second payment details based on the single security validation of the first payment details, the first verification and the second verification.

6. The at least one computer readable storage medium of claim 5, wherein the instructions, when executed, cause the computing device to:
perform the single security validation when the first payment details are received and before the second payment details are received.

7. The at least one computer readable storage medium of claim 5, wherein the instructions, when executed, cause the computing device to:
set the window of time to a first value when the first payment details are transmitted over the private network; and
set the window of time to a second value when the first payment details are transmitted over the public network, wherein the first value is greater than the second value.

8. The at least one computer readable storage medium of claim 5, wherein the instructions, when executed, cause the computing device to:
execute a session verification to verify that the first payment details and the second payment details are originally provided from a same point of origin to validate the second payment details based on the single security validation of the first payment details.

9. A method for processing multiple transactions, the method comprising:
receiving, by one or more servers, a first transmission that includes first payment details of a first transaction, wherein the first transaction is an online purchase by a user from a first merchant;
identifying, by the one or more servers, a multiple-transaction selection associated with the first transaction;
receiving, by the one or more servers, a second transmission that includes second payment details of a second transaction, wherein the second transaction is an online purchase by the user from a second merchant;
performing, by the one or more servers, a single security validation to validate the first payment details;
identifying, by the one or more servers, a security context of a point of origin for the first payment details, wherein the security context identifies whether the first payment details were transmitted over a private network or a public network;
in response to the first payment details being verified, transmit an algorithm to the point of origin, and automatically determining, by the one or more servers, a window of time based on the security context to establish a secure session to validate transactions based on the single security validation of the first payment details;
identifying a first unique value in the second transmission;
conducting a first verification that the first unique value is generated based on the algorithm;
conducting, by the one or more servers, a second verification that the second transaction occurs within the window of time; and
validating the second payment details based on the single security validation of the first payment details, the first verification and the second verification.

10. The method of claim 9, further comprising:
performing, by the one or more servers, the single security validation when the first payment details are received by the one or more servers and before the second payment details are received by the one or more servers.

11. The method of claim 9, further comprising:
setting, by the one or more servers, the window of time to a first value when the first payment details are transmitted over the private network; and
setting, by the one or more servers, the window of time to a second value when the first payment details are transmitted over the public network, wherein the first value is greater than the second value.

12. The method of claim 9, further comprising:
executing, by the one or more servers, a session verification to verify that the first payment details and the second payment details are originally provided from a same point of origin to validate the second payment details based on the single security validation of the first payment details.

* * * * *